(12) United States Patent
Bushell et al.

(10) Patent No.: US 8,126,312 B2
(45) Date of Patent: Feb. 28, 2012

(54) USE OF MULTIPLE RELATED TIMELINES

(75) Inventors: John Samuel Bushell, San Jose, CA (US); Christopher Lance Flick, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1099 days.

(21) Appl. No.: 11/098,006

(22) Filed: Mar. 31, 2005

(65) Prior Publication Data

US 2006/0222320 A1    Oct. 5, 2006

(51) Int. Cl.
*H04N 5/94*    (2006.01)
*H04N 9/88*    (2006.01)
*H04N 5/93*    (2006.01)

(52) U.S. Cl. .................................. 386/278; 386/353

(58) Field of Classification Search .................. 386/109, 386/111, 125, 126; 375/240.01–240.29
See application file for complete search history.

(56) References Cited

U.S. PATENT DOCUMENTS

| | | | | |
|---|---|---|---|---|
| 6,084,637 A * | 7/2000 | Oku et al. | ...................... | 348/445 |
| 6,201,925 B1 * | 3/2001 | Brewer et al. | ................... | 386/52 |
| 6,271,774 B1 * | 8/2001 | Kato | ................ | 341/52 |
| 6,393,204 B2 * | 5/2002 | Setoguchi et al. | ............ | 386/111 |
| 6,597,858 B1 * | 7/2003 | Linzer | ............................. | 386/52 |
| 6,611,624 B1 * | 8/2003 | Zhang et al. | ................... | 382/232 |
| 6,654,541 B1 * | 11/2003 | Nishi et al. | ....................... | 386/95 |
| 6,678,332 B1 * | 1/2004 | Gardere et al. | ........... | 375/240.26 |
| 6,952,521 B2 * | 10/2005 | Kelly et al. | ...................... | 386/52 |
| 7,027,516 B2 * | 4/2006 | Anderson et al. | ........ | 375/240.26 |
| 7,558,465 B2 * | 7/2009 | Fuchie | ............................. | 386/52 |
| 2002/0012400 A1 * | 1/2002 | Nishi et al. | ............... | 375/240.25 |
| 2002/0087976 A1 * | 7/2002 | Kaplan et al. | .................. | 725/34 |
| 2003/0175011 A1 * | 9/2003 | Nagai et al. | .................... | 386/52 |
| 2004/0105499 A1 * | 6/2004 | Kawa et al. | ............. | 375/240.25 |
| 2005/0117891 A1 * | 6/2005 | Suzuki | ............................ | 386/96 |
| 2006/0034375 A1 * | 2/2006 | Ward | ........................ | 375/240.28 |

\* cited by examiner

*Primary Examiner* — William C Vaughn, Jr.
*Assistant Examiner* — Gelek W Topgyal
(74) *Attorney, Agent, or Firm* — Fish & Richardson P.C.

(57) ABSTRACT

A sequence of video images can be represented using multiple related timelines by generating a first timeline identifying a decode order associated with a sequence of video images and a second timeline identifying a display order associated with the sequence of video images, wherein the sequence of video images is comprised of one or more samples. The first and second timelines can be correlated based on an offset, which represents a time period by which decoding precedes display. The sequence of video images can then be played in accordance with the correlated first and second timelines. Additionally, the decode order in the first timeline can differ from the display order in the second timeline. A revised offset between the first and second timelines can be determined after the sequence of video images has been edited and the first and second timelines can be correlated based on the revised offset.

26 Claims, 5 Drawing Sheets

USE OF MULTIPLE RELATED TIMELINES

BACKGROUND

This document relates to video coding devices and systems, and to timeline strategies employed in conjunction with such devices.

Digital-based electronic media formats have become widely accepted. Digital compact discs (CDs) and audio files, such as MP3s (MPEG Audio—layer 3), are now commonplace. Video media, however, has been slower to transition to digital storage and digital transmission formats than audio media. One reason for the slower integration of digital video media formats into the marketplace is the volume of information required to accurately produce video of an acceptable quality from a digital representation. Additionally, encoding and decoding video in a digital format consumes substantial system resources and requires systems capable of processing information at high speeds. Further, the large amounts of information used to represent digital video also necessitate high-bandwidth transmission systems and high-capacity storage systems.

The development of faster computer processors, high-density storage media, and efficient compression and encoding algorithms have led to more widespread implementation of digital video media formats in recent years. The Digital Versatile Disc (DVD) has rapidly replaced video cassettes as the primary storage media for video due to its high image quality, very high audio quality, convenience, and added functionality. Further, the digital Advanced Television Standards Committee video transmission system is in the process of replacing the analog National Television Standards Committee transmission system.

Computer systems have been using various digital video formats for a number of years. Specifically, computer systems have employed many different methods for compressing and encoding or decompressing and decoding digital video. A video compression/decompression method, implemented using hardware, software, or a combination of hardware and software, is commonly referred to as a CODEC. A number of popular digital video compression and encoding systems have been developed based on the standards propounded by the Moving Picture Experts Group (MPEG), including the MPEG-1, MPEG-2, and MPEG-4 standards. Video CDs and early consumer-grade digital video editing systems use the MPEG-1 digital video encoding format. DVDs, video games, and some direct broadcast satellite systems are encoded in accordance with the MPEG-2 standard. MPEG-4 is now being used to deliver DVD (MPEG-2) quality video at lower data rates and smaller file sizes, and thus enables digital video playback on products ranging from satellite television systems to wireless devices.

The MPEG standards set forth methods for compressing a series of images, such as frames or fields, and for encoding the compressed images into a digital bit stream. When a video image is encoded in an MPEG system, the video image is divided into multiple pixel arrays, such as 8×8 pixel blocks or 16×16 pixel macroblocks. Each pixel array can then be independently compressed and encoded.

When performing compression using an MPEG coder, such as a coder that is in compliance with the MPEG-1, MPEG-2, or MPEG-4 standard, images may be encoded using three picture types. Specifically, images may be encoded using I-pictures, P-pictures, and B-pictures. I-pictures are encoded with reference only to the information within the picture, and thus may be decoded without reference to any other pictures. P-pictures are encoded with reference to preceding pictures, and thus permit the use of motion compensation to provide for a greater degree of compression. B-pictures are encoded with reference to succeeding pictures, and also permit the use of motion compensation. Because B-pictures are decoded using succeeding pictures, however, some reordering of the sequence of decoded pictures is required prior to display.

Digital video systems have also been developed based on standards other than those published by MPEG. For example, similar standards have been circulated by other organizations, such as the H.261-H.264 standards developed by the International Telecommunication Union. Additionally, proprietary codecs have been developed by other organizations and individuals. For example, Compression Technologies, Inc. produces digital video compression tools based on the Cinepak codec and DivXNetworks produces a variety of applications based on the DivX codec. These standard and proprietary codecs represent only a few of the many different ways to compress and encode digital video information.

SUMMARY

The present inventors recognized a need to implement timeline strategies that will permit the use of pictures predicted or interpolated from future pictures—that is, pictures that appear later in the display order—for video compression and decompression. Accordingly, the methods and apparatus described here implement techniques for using independent decode and display timelines in the decoding and display of a media sequence comprised of one or more tracks of digital video information that can include pictures predicted or interpolated from future pictures.

In general, in one aspect, the techniques can be implemented to include generating a first timeline identifying a decode order associated with a sequence of video images and a second timeline identifying a display order associated with the sequence of video images, wherein the sequence of video images comprises one or more samples; correlating the first timeline with the second timeline based on an offset, wherein the offset corresponds to a period of time by which decoding precedes display; and playing the sequence of video images in accordance with the correlated first timeline and second timeline.

The techniques also can be implemented such that the decode order identified in the first timeline differs from the display order identified in the second timeline. The techniques further can be implemented such that a decode time and a decode duration are associated with one or more samples included in the sequence of video images. Additionally, the techniques can be implemented such that a decode duration associated with a first sample included in the sequence of video images differs from a decode duration associated with a second sample included in the sequence of video images.

The techniques also can be implemented such that a display time and a display offset are associated with one or more samples included in the sequence of video images. The techniques further can be implemented such that a display offset associated with a sample included in the sequence of video images comprises a negative value. Additionally, the techniques can be implemented to include setting the offset equal to the magnitude of the largest negative display offset associated with a sample included in the sequence of video images.

The techniques also can be implemented such that a first sample included in the sequence of video images is associated with a first format and a second sample included in the sequence of video images is associated with a second format. The techniques further can be implemented such that a first sample included in the sequence of video images is associated with a first frame rate and a second sample included in the sequence of video images is associated with a second frame rate. Additionally, the techniques can be implemented to include determining a revised offset between the first timeline and the second timeline after the sequence of video images has been edited and correlating the first timeline with the second timeline based on the revised offset. The techniques also can be implemented such that each of the samples comprising the sequence of video images is associated with a common data store.

In general, in another aspect, the techniques can be implemented to include generating a first timeline identifying a decode order associated with a sequence of video images and a second timeline identifying a display order associated with the sequence of video images, wherein the sequence of video images comprises one or more samples; determining a decode end time and a display end time associated with the sequence of video images; and extending a decode duration associated with a last sample identified in the first timeline such that the decode end time equals the display end time.

In general, in another aspect, the techniques can be implemented to include processor electronics configured to generate a first timeline identifying a decode order associated with a sequence of video images and a second timeline identifying a display order associated with the sequence of video images, wherein the sequence of video images is comprised of one or more samples; correlate the first timeline with the second timeline based on an offset, wherein the offset represents a period of time by which decoding precedes display; and play the sequence of video images in accordance with the correlated first timeline and second timeline.

The techniques also can be implemented such that the decode order identified in the first timeline differs from the display order identified in the second timeline. Further, the techniques can be implemented such that a decode time and a decode duration are associated with one or more samples included in the sequence of video images. Additionally, the techniques can be implemented such that a decode duration associated with a first sample included in the sequence of video images differs from a decode duration associated with a second sample included in the sequence of video images.

The techniques also can be implemented such that a display time and a display offset are associated with one or more samples included in the sequence of video images. Further, the techniques can be implemented such that a display offset associated with a sample included in the sequence of video images comprises a negative value. Additionally, the techniques can be implemented such that the processor electronics are further configured to set the offset equal to the magnitude of the largest negative display offset associated with a sample included in the sequence of video images.

The techniques also can be implemented such that a first sample included in the sequence of video images is associated with a first format and a second sample included in the sequence of video images is associated with a second format. Further, the techniques can be implemented such that a first sample included in the sequence of video images is associated with a first frame rate and a second sample included in the sequence of video images is associated with a second frame rate. Additionally, the techniques can be implemented such that the processor electronics are further configured to determine a revised offset between the first timeline and the second timeline after the sequence of video images has been edited and correlate the first timeline with the second timeline based on the revised offset. The techniques also can be implemented to include a common data store to store the sequence of video images.

The techniques described in this document may be implemented to realize one or more of the following advantages. For example, the techniques can be implemented to combine samples encoded using different source timing relationships in a common media sequence. As such, the techniques allow the combining of sequences comprised only of I-pictures or I-pictures and P-pictures, with sequences comprised of I-pictures, P-pictures, and B-pictures in essentially any combination. The techniques also can be implemented to combine samples with different rates into a single media sequence. Additionally, the techniques can be implemented to permit the specification of a negative display offset from the decode time associated with a sample in a media sequence. Further, the techniques can be implemented to permit the editing of a video sequence without reference to buffering requirements during decoding. The techniques also can be implemented to lock the relationship between the decode times associated with samples included in the media sequence and the display times associated with the samples included in the media sequence prior to decoding.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
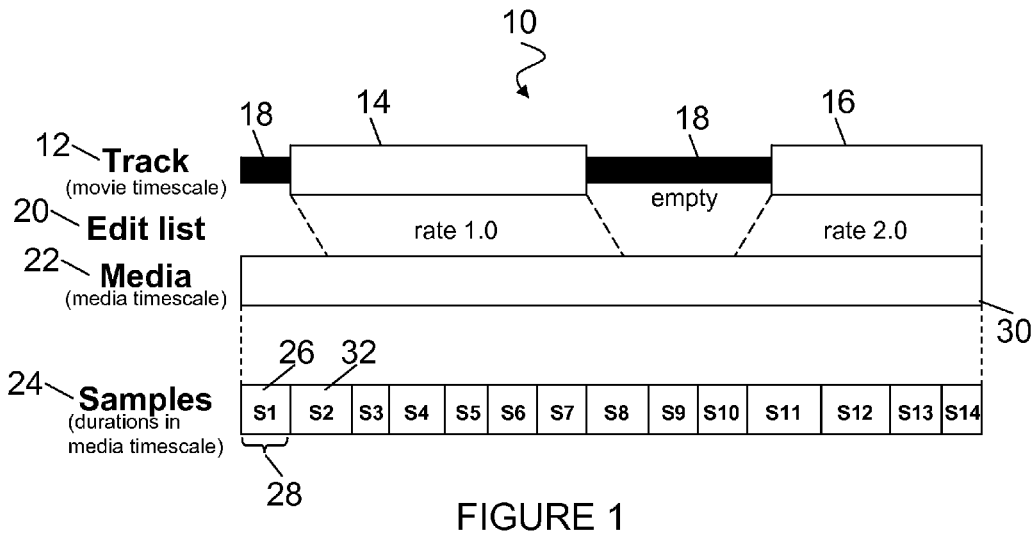
FIG. 1 is a block diagram of a media sequence with an integrated list of samples.

FIG. 1 presents a media sequence 10, such as a portion of a movie. The media sequence 10 can be organized as a track 12 of digital video information that can include one or more image segments, such as the first image segment 14 and the second image segment 16. In turn, each image segment is comprised of one or more samples, such as frames of image data. The track 12 also can include one or more empty segments 18, which are not associated with any video information and during which no video information is presented. In addition to the track 12 of digital video information, the media sequence 10 also can include a track of audio information and a track of text information (not shown).

The track 12 of digital video information represents the movie timescale and the image segments 14 and 16 included in the track 12 are sequentially ordered with respect to time. Therefore, the first image segment 14 in the track 12 is temporally ordered such that it precedes the second image segment 16. During forward play, the first image segment 14 will thus be displayed prior to the display of the second image segment 16. As with the image segments 14 and 16, each of the empty segments 18 included in the track 12 is temporally ordered with respect to the other segments.

The order of the image segments 14 and 16 and the empty segments 18 included in the track 12 is defined in an edit list 20. For each image segment and empty segment included in the track 12, there is a corresponding entry, or edit, in the edit list 20. Each edit defines parameters associated with the image segment or the empty segment to which it corresponds. For example, an edit may identify the point in the movie timescale at which the corresponding image segment or empty segment is to begin. The edit also may identify the duration, expressed in terms of the movie timescale, over which the corresponding image segment or empty segment will be played. Further, with respect to image segments, an edit identifies the rate at which the corresponding image segment is to be played back. A playback rate of 1.0 can be associated with the first image segment 14 to indicate that playback should occur at a rate equal to the timing information associated with the first image segment 14. Similarly, a playback rate of 2.0 can be associated with the second image segment 16 to indicate that playback should occur at a rate equal to twice the timing information associated with the second image segment 16.

The one or more samples comprising each of the image segments included in the track 12 are contained in the media 22. If the edit list 20 is modified to insert an additional image segment into the track 12 after the media 22 has been populated, the samples comprising the newly added image segment also are entered into the media 22. It is also possible to delete an image segment from the track 12 during editing, but the samples comprising the deleted image segment are not removed from the media 22. Once a sample has been added to the media 22, its intrinsic properties cannot be modified and the sample cannot be removed from the media 22. The media 22 thereby ensures that every sample associated with an image segment previously identified in the edit list 20 will be available if it is ever required in connection with the track 12.

The media 22 also incorporates the concept of a media timescale, which is a positive integer. The media can be subdivided into X units of media time, where X is a positive integer. The duration of each unit of media time can then be determined to be X÷(media timescale). As described above, the media 22 contains every sample associated with an image segment that has previously been inserted into the track 12. Therefore, the media 22 can be ordered as a sequential list of samples 24, wherein each sample is assigned a unique sample number. For example, the first sample 26 in the list of samples 24 can be assigned sample number S1. A sample duration 28 also is associated with each sample in the list of samples 24, indicating how long, in media time, a given sample will be displayed. Sample durations, which are expressed as positive integers, may differ among different samples in the media 22. The media duration 30, in turn, is equal to the sum of the sample durations for all of the samples included in the media 22.

The first sample 26 included in the media 22 has a sample time of zero, which also represents the zero point of the media timescale. The second sample 32 included in the media 22 has a sample time equal to the first sample duration 28, because the sample time of the first sample 26 is zero. Each subsequent sample included in the list of samples 24 has a sample time equal to the sum of the sample time of the preceding sample and the duration of the preceding sample. Therefore, the samples included in the media 22 partition the media time for the entire media duration 30 without any gaps.

The structure of the list of samples 24 as represented in FIG. 1 does not facilitate the use of B-pictures, as it does not separately account for decode times and display times. FIGS. 2-9, and their corresponding descriptions, set forth details of a system and techniques that facilitate the use of B-pictures.

Figure 2:
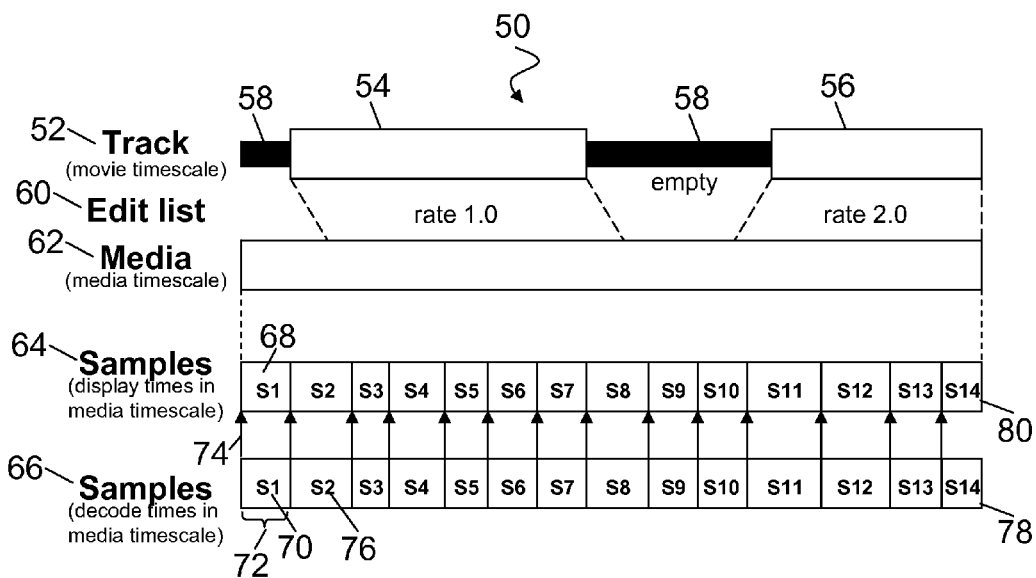
FIGS. 2-3 are block diagrams of media sequences with separate display and decode lists of samples.

FIG. 2 presents a media sequence 50, which is similar to the media sequence 10 presented with respect to FIG. 1. In an implementation, the media sequence 50 can be organized as a track 52 of digital video information that can include one or more image segments, such as the first image segment 54 and the second image segment 56. In turn, each of the image segments can be comprised of one or more samples, such as frames of image data. Additionally, the one or more image segments can be encoded in a variety of formats, such as .mpg, .jpg, and .avi, and image segments encoded in different formats can be included in the same track.

The track 52 also can include one or more empty segments 58, which are not associated with any video information and during which no video information is presented. In another implementation, the media sequence 50 can include two or more tracks of video information, and each of the tracks of video information can include one or more image segments. In such an implementation, an empty segment included in a first track can correspond temporally to an image segment included in a second track. In addition to the track 52 of digital video information, the media sequence 50 also can include one or more tracks of audio information and one or more tracks of text information (not shown).

Also as discussed above, the track 52 of digital video information represents the movie timescale and the image segments included in the track 52, such as the first image segment 54 and the second image segment 56, are sequentially ordered with respect to time. Further, the digital video information included in the track 52 can be encoded in a compressed format in order to reduce the amount of information that must be stored and to reduce the amount of bandwidth required to transmit the information. For example, the digital video information can be represented using only I-pictures, a combination of I-pictures and P-pictures, or a combination of I-pictures, P-pictures, and B-pictures.

The order of the image segments and the empty segments included in the track 52 is defined in the edit list 60. For each image segment and empty segment included in the track 52, there is a corresponding entry, or edit, in the edit list 60. Each edit defines parameters associated with the image segment or empty segment to which it corresponds. For example, an edit identifies the point in the movie timescale at which the corresponding image segment or empty segment is to begin. The edit also identifies the duration, expressed in terms of the movie timescale, over which the corresponding image segment or empty segment will be played. Further, with respect to image segments, an edit identifies the rate at which the corresponding image segment is to be played back. A playback rate of 1.0 can be associated with the first image segment 54 to indicate that playback should occur at a rate equal to the timing information associated with the first image segment 54. Similarly, a playback rate of 2.0 can be associated with the second image segment 56 to indicate that playback should occur at a rate equal to twice the timing information associated with the second image segment 56.

The media 62 incorporates the concept of a media timescale, which is a positive integer and is independent of the movie timescale associated with the track 52. The media can be subdivided into X units of media time, where X is a positive integer. The duration of each unit of media time can then be determined to be X÷(media timescale).

The one or more samples comprising each of the image segments presently or previously included in the track 52 are contained in the media 62. Unlike the media sequence 10 described with reference to FIG. 1, however, the media sequence 50 includes two separate but related lists of samples. The display list of samples 64 and the decode list of samples 66 each represent a sequential ordering of the samples contained in the media 62. In the display list of samples 64, for each of the image segments included in the media 62, all of the samples associated with a particular image segment are arranged in the order in which they are displayed during forward playback of that image segment. In the decode list of samples 66, for each of the image segments included in the media 62, all of the samples associated with a particular image segment are arranged in the order in which they are decoded during forward playback of that image segment. The display list of samples 64 also can be represented as a display timeline and the decode list of samples 66 can be represented as a decode timeline. Each sample identified in the decode list of samples 66 can be logically associated with a corresponding sample identified in the display list of samples 64 by a vector. For example, the first sample 70 identified in the decode list of samples 66 can be logically associated with the corresponding sample identified in the display list of samples 64 by the first vector 74.

Once a sample has been added to the media 62, the sample cannot thereafter be removed from the media 62. The media 62 thereby ensures that every sample previously identified in the edit list 60 will be available if it is ever required in connection with the track 52. Further, once a sample has been added to the media, none of the intrinsic values associated with the sample can be modified. There is, however, one exception to this rule. If the sample is the last sample in the media, the sample decode duration corresponding to that sample can be increased by the amount required to make the media decode end time equal the media display end time.

The multiple timeline schema is based on the decode order of the samples included in the media 62, not the display order of the samples. As such, a sample decode duration is associated with each sample. The sample decode duration, which is always a positive value, indicates the difference between the start of the decode time of the associated sample and the start of the decode time of the next sample. For example, a first sample decode duration 72 is associated with the first sample 70 identified in the decode list of samples 66. Therefore, the sample decode duration indicates the period of the first sample 70 expressed in media time. The sample decode duration 72 does not, however, identify the amount of time required to decode the first sample 70. Sample decode durations associated with the samples identified in the decode list of samples 66 are not required to be identical.

The media decode duration 78, or media decode end time, is equal to the sum of the sample decode durations for every sample included in the media 62. The first sample 70 included in the media 62 has a sample decode time of zero, which also represents the zero point of the media timescale. The second sample 76 included in the media 62 has a sample decode time equal to the first sample decode duration 72, because the sample decode time of the first sample 70 is zero. Each subsequent sample identified in the decode list of samples 66 has a sample decode time equal to the sum of the sample decode time of the preceding sample and the sample decode duration of the preceding sample. Therefore, the samples included in the media 62 partition the media time for the entire media decode duration 78 without any gaps.

Each sample included in the media 62 also has a sample display offset, which can be a positive value, zero, or a negative value. The display time of a sample can therefore be derived by summing the sample decode time and the sample display offset associated with that sample. Additionally, the display time associated with a sample cannot be negative. Therefore, if the sample display offset is a negative value, the magnitude of the sample display offset can be no greater than the sample decode time. The media display end time 80 is derived by summing the display time associated with the last sample included in the media 62 with the decode duration associated with the last sample included in the media 62.

The display duration of a sample is not an intrinsic property associated with that sample, but is instead determined with reference to other samples. If a sample with a subsequent display time exists in the media 62, the display duration of the present sample can be determined as the difference between the display time of the present sample and the display time of the subsequent sample. If no sample with a subsequent display time exists in the media 62, the display duration of the present sample can be set equal to a placeholder value, such as the sample decode duration associated with the sample. Further, because a fixed display duration is not associated with the samples included in the media 62, the display duration associated with a sample is subject to change if one or more additional samples with subsequent display times are added to the media 62.

As can be seen in FIG. 2, when the media sequence 50 contains only I-pictures, the display list of samples 64 and the decode list of samples 66 are identically ordered. For example, the first sample 70 identified in the decode list of samples 66 can be assigned the sample number S1. Because no reordering is required, the sample number S1 also appears as the first sample 68 identified in the display list of samples 64. Similarly, the display list of samples 64 and the decode list of samples 66 are identically ordered when the media sequence 50 contains I-pictures and P-pictures. In such circumstances, the zero point of the decode list of samples 66 can occur at the same point in time as the zero point of the display list of samples 64.

Because B-pictures provide for a greater degree of compression and flexibility, it is advantageous to compress and encode a media sequence using a combination of I-pictures, P-pictures, and B-pictures. In the event the media sequence 50 includes one or more B-pictures, however, the ordering of the samples in the display list of samples 64 and the ordering of the samples in the decode list of samples 66 will differ as a result of the reordering that is required between decode and display.

Figure 3:
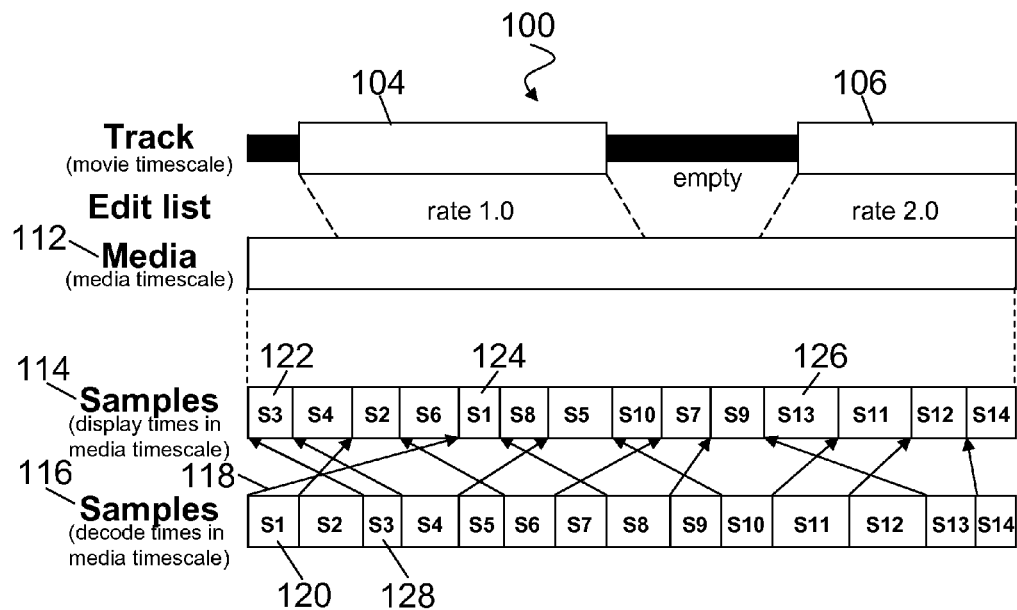

FIG. 3 presents a media sequence 100 that includes multiple B-pictures. The media sequence 100 is similar to the media sequence 50 described with respect to FIG. 2, with the exception of the display list of samples 114 and the decode list of samples 116. Because the one or more image segments included in the media 112, such as the first image segment 104 and the second image segment 106, contain one or more samples that have been compressed and encoded as B-pictures, the order of the samples identified in the decode list of samples 116 does not match the order of the samples identified in the display list of samples 114. For example, the first sample 120 identified in the decode list of samples 116 can be assigned the sample number S1. The corresponding sample 124 in the display list of samples 114, which is also assigned the sample number S1, is ordered as the fifth sample in the sequence. Similarly, the third sample 128 identified in the decode list of samples 116 can be assigned the sample number S3. The corresponding sample 122 in the display list of samples 114, which is also assigned the sample number S3, appears as the first sample in the sequence.

The reordering necessitated by the use of B-pictures is further illustrated by the vectors used to logically associate the samples identified in the decode list of samples 116 with the corresponding samples identified in the display list of samples 114, such as the first vector 118. As illustrated by the first vector 118, the first sample 120 identified in the decode list of samples 116 will be decoded prior to the decoding of any other samples included in the media 112, but it will not be immediately displayed. Therefore, decoding of the samples included in the media 112 must begin at some point in time prior to the display of those samples. As such, an advance decode time is also associated with the media 112. The advance decode time is set to equal the magnitude of the largest negative display offset associated with a sample identified in the display list of samples 114. It is possible for the advance decode time to be zero under certain circumstances, such as when the samples included in the media 112 are encoded as I-pictures and P-pictures.

The advance decode time represents the period by which the sample decode time associated with the first sample 120 identified in the decode list of samples 116 precedes the display time associated with the sample 122 identified in the display list of samples 114 as the sample to be displayed first. Therefore, the advance decode time can be used to correlate the decode timeline with the display timeline. As described above, the display time associated with the sample 122 identified in the display list of samples 114 as the sample to be displayed first can be determined by summing the sample decode time and the sample display offset associated with the sample 122. If a track is edited after the advance decode time has been determined, the advance decode time must be recalculated before the media sequence can be displayed.

Figure 4:
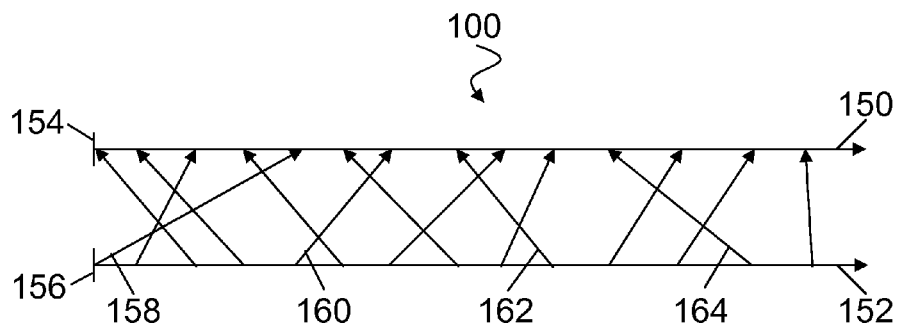
FIGS. 4-5 are timelines of a media sequence.

FIG. 4 presents a display timeline 150 and a decode timeline 152 associated with the media sequence 100 presented in FIG. 3. Vectors, such as the vector 158 that logically associates the first sample 120 identified in the decode list of samples 116 with the corresponding sample 124 identified in the display list of samples 114, graphically depict the display offsets associated with each of the samples included in the media 112. When the zero point 154 of the display timeline 150 is aligned with the zero point 156 of the decode timeline 152, it can be determined that the vectors associated with several samples, such as the vectors 158 and 160, indicate a positive display offset between the sample decode time and the corresponding display time associated with a particular sample. Other vectors, such as vectors 162 and 164, indicate a negative display offset between the sample decode time and the corresponding display time associated with a particular sample. The display time of a sample cannot occur prior to the sample decode time associated with that sample. Therefore, if any sample in the media is characterized by a negative display offset, the zero point 154 of the display timeline 150 cannot be aligned with the zero point 156 of the decode timeline 152.

In order to properly display the media sequence 100, the decode timeline 152 must be shifted backward in time with respect to the display timeline 150 by a period equal to the advance decode time. The vector 164 associated with the eleventh sample 126 identified in the display list of samples 114 in FIG. 3, represents the largest negative display offset of any sample included in the media 112. Therefore, the advance decode time is set to equal the magnitude of the display offset associated with the eleventh sample 126 identified in the display list of samples 114 in FIG. 3.

Figure 5:
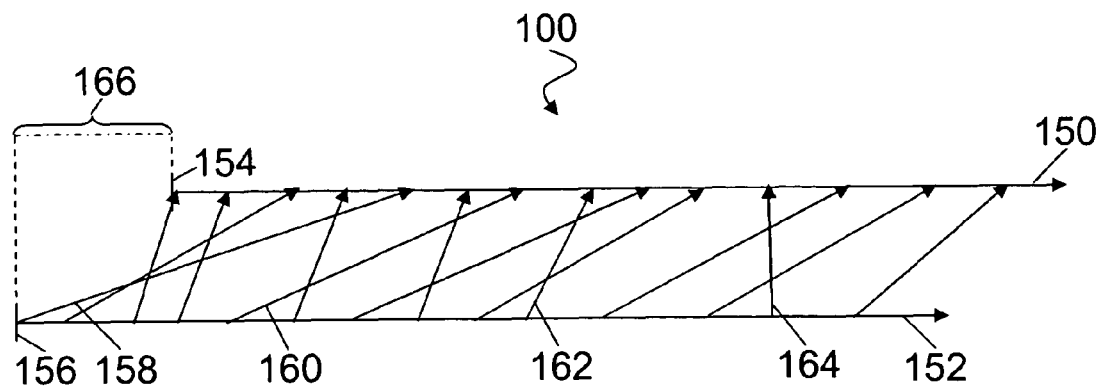

FIG. 5 demonstrates the orientation of the vectors that graphically depict the display offsets associated with each of the samples included in the media 112 after the decode timeline 152 has been shifted backward in time with respect to the display timeline 150 by a period of time 166 equal to the advance decode time. The zero point 156 of the decode timeline 152 precedes the zero point 154 of the display timeline 150 by exactly the period of time 166 equal to the advance decode time. As such, all of the vectors associated with the samples included in the media 112, such as vectors 158, 160, and 162, indicate a point on the display timeline 150 that is subsequent to, and thus later in time than, the corresponding point on the decode timeline 152. The only exception being the vector 164 associated with the sample characterized by the largest negative display offset, which is horizontal and indicates that decode and display will occur simultaneously with respect to the media timescale. Therefore, none of the samples included in the media 112 have an associated display time that precedes the associated decode time and the media sequence 100 can thus be properly displayed.

Figure 6:
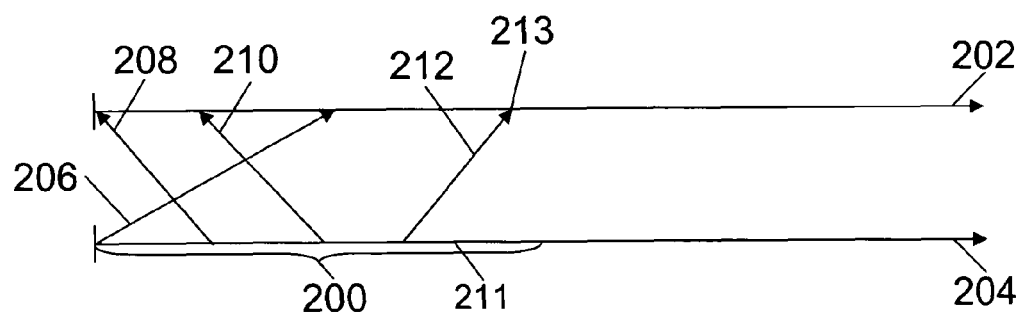
FIGS. 6-8 are timelines of an imperfectly finished media sequence.

As discussed above, the only intrinsic value associated with a sample included in the media that can be modified is the sample decode duration associated with the last sample in the media. FIG. 6 presents a series of samples, represented by vectors 206, 208, 210, and 212, comprising an imperfectly finished image segment 200 in the context of a display timeline 202 and a decode timeline 204. When an image segment is prematurely terminated, such as a partial copy of an image segment, one or more samples may be missing. As a result, it may be necessary to extend the display duration of one or more included samples to compensate for the one or more missing samples. Further, display errors may arise if an additional image segment is appended to the end of an imperfectly finished image segment.

For example, the imperfectly finished image segment 200 includes an I-picture represented by a first vector 206, a B-picture represented by a second vector 208, and an additional B-picture represented by a third vector 210. These samples are properly aligned. The imperfectly finished image segment 200 also includes a P-picture represented by a fourth vector 212. The sample decode duration associated with the P-picture represented by the fourth vector 212 terminates at a point in time 211 prior to the display time 213 associated with the P-picture. Therefore, if a separate image segment is subsequently inserted into the media sequence following the imperfectly finished image segment 200, the display times of two or more samples may collide. Thus, it is necessary to extend the sample decode duration associated with the P-picture represented by the fourth vector 212 in order to permit the P-picture to be properly displayed. The sample decode duration associated with the P-picture represented by the fourth vector 212 is extended by adding to it the amount of time necessary to make the media decode end time equal the media display end time. In another implementation, it may be necessary to extend the sample decode duration associated with the last sample in the media if an image segment with a different frame rate is subsequently inserted into the media sequence.

Figure 7:
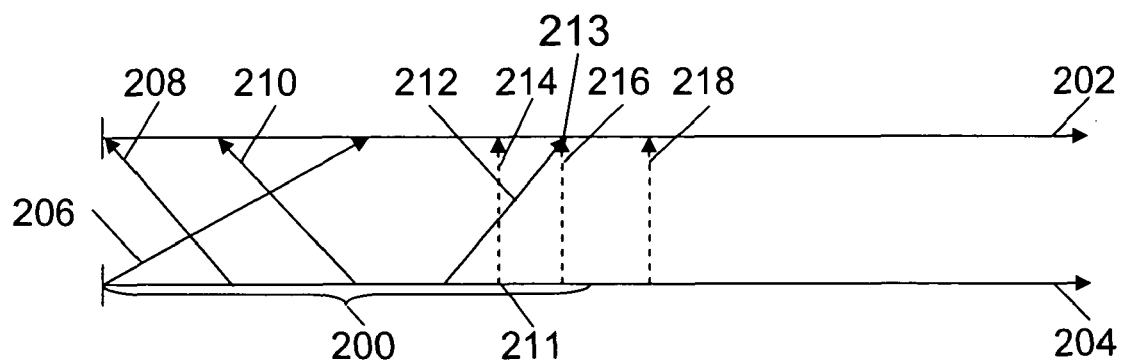

In FIG. 7, a series of I-pictures represented by vectors 214, 216, and 218 are shown appended to the end of the imperfectly finished image segment 200. The series of I-pictures is arranged such that the sample decode time associated with the first I-picture represented by the fifth vector 214 immediately follows the point in time 211 at which the sample decode duration of the P-picture represented by the fourth vector 212 terminates. Because of the large display offset is associated with the P-picture represented by the fourth vector 212, however, the P-picture is displayed after the I-picture represented by the fifth vector 214. Additionally, the display time associated with the I-picture represented by the sixth vector 216 is concurrent with the display time associated with the P-picture represented by the fourth vector 212. The collision between the display times associated with multiple samples illustrates the need to extend the sample decode duration associated with the P-picture represented by the fourth vector 212.

Figure 8:
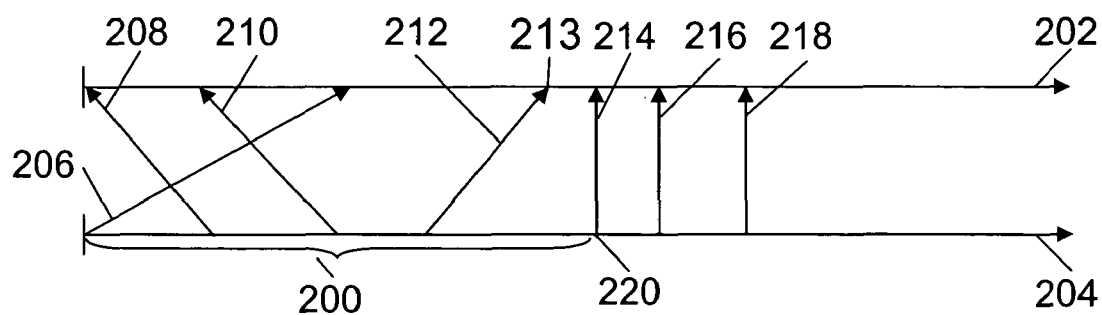

FIG. 8 presents the alignment of the imperfectly finished image segment 200 and the series of appended I-pictures represented by the vectors 214, 216, and 218 after the sample decode duration associated with the P-picture represented by the fourth vector 212 has been extended. The sample decode duration associated with the P-picture represented by the vector 212 has been extended such that it terminates at a point in time 220 following the display time 213 associated with the P-picture. The sample decode time associated with the I-picture represented by the fifth vector 214 occurs immediately after the point in time 220 at which the sample decode duration associated with the P-picture represented by the fourth vector 212 terminates. Therefore, display of the P-picture represented by the vector 212 no longer collides with the display of any subsequent sample.

Figure 9:
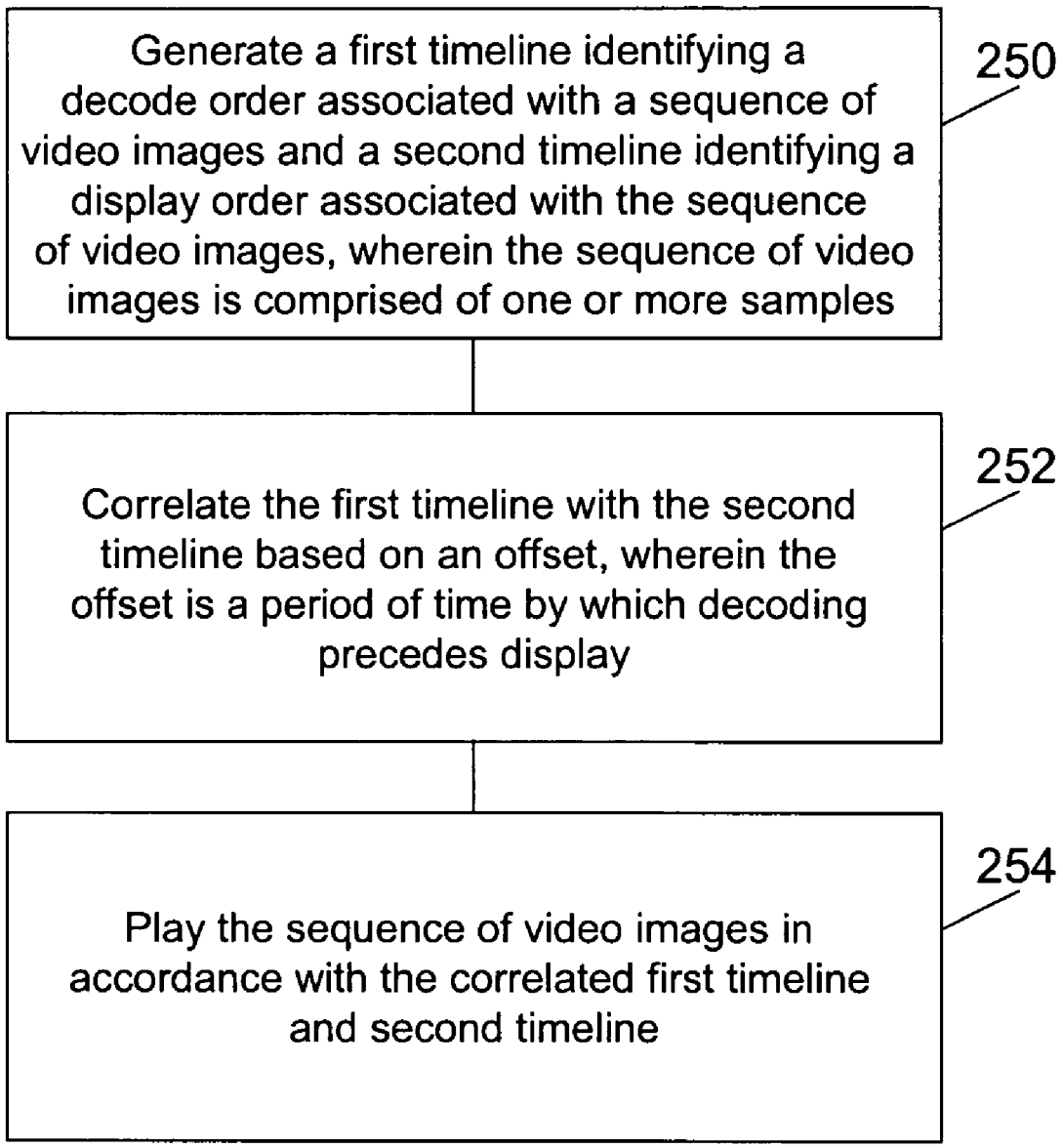
FIG. 9 is a flowchart of a method of using multiple related timelines.

FIG. 9 describes a method of using multiple related timelines in representing a sequence of video images. In a first step 250, a first timeline identifying a decode order associated with a sequence of video images and a second timeline identifying a display order associated with the sequence of video images are generated, wherein the sequence of video images is comprised of one or more samples. Once the first and second timelines have been generated, the second step 252 is to correlate the first timeline with the second timeline based on an offset, wherein the offset is a period of time by which decoding precedes display. In a third step 254, the sequence of video images is played in accordance with the correlated first timeline and second timeline.

A number of implementations have been disclosed herein. Nevertheless, it will be understood that various modifications may be made without departing from the spirit and scope of the claims. Accordingly, other implementations are within the scope of the following claims.

What is claimed is:

1. A method comprising:
   editing a video clip comprising a sequence of video samples, the sequence of video samples comprising a finite quantity of samples;
   generating a decode timeline identifying a decode order associated with the sequence of video samples and a display timeline identifying a display order associated with the sequence of video samples, such that a decode start time of a first sample in the generated decode timeline is equal to a display start time of a first sample in the generated display timeline;
   determining, for each one of the sequence of video samples, a magnitude of a time period between a display start time and a decode end time associated with the one of the sequence of video samples;
   obtaining a time offset as a largest time period magnitude from among the determined time period magnitudes;
   offsetting the generated decode timeline from the generated display timeline such that the decode start time of the first sample in the offset decode timeline precedes the display start time of the first sample in the generated display timeline by the obtained time offset; and
   playing the edited video clip in accordance with the offset decode timeline and the generated display timeline.

2. The method of claim 1, wherein the decode order identified in the decode timeline differs from the display order identified in the display timeline.

3. The method of claim 1, wherein a decode duration is associated with one or more samples included in the sequence of video samples.

4. The method of claim 3, wherein a decode duration associated with a first sample included in the sequence of video samples differs from a decode duration associated with a second sample included in the sequence of video samples.

5. The method of claim 1, wherein a display offset is associated with one or more samples included in the sequence of video samples.

6. The method of claim 1, wherein a first sample included in the sequence of video samples is associated with a first format and a second sample included in the sequence of video samples is associated with a second format.

7. The method of claim 1, wherein a first sample included in the sequence of video samples is associated with a first frame rate and a second sample included in the sequence of video samples is associated with a second frame rate.

8. The method of claim 1, further comprising:
   reediting the video clip having the offset decode timeline and the generated display timeline, such that the reedited video clip comprises another sequence of video samples;
   generating another decode timeline identifying another decode order associated with the other sequence of video samples and another display timeline identifying another display order associated with the other sequence of video samples; and
   offsetting the other generated decode timeline from the other generated display timeline, at least in part by
      obtaining a revised offset between the other generated decode timeline and the other generated display timeline, and
      offsetting correlating the other generated decode timeline from the other generated display timeline based on the revised offset.

9. The method of claim 1, wherein each of the video samples comprising the sequence of video samples is associated with a common data store.

10. The method of claim 1, further comprising:
    determining a display duration associated with a video sample included in the sequence of video samples based on a display time corresponding to an immediately succeeding video sample in the display order.

11. The method of claim 1, wherein one or more video samples included in the sequence of video samples of the edited video clip are associated with a first video clip and one or more other video samples included in the sequence of video samples are associated with a second video clip.

12. A method comprising:
    editing a video clip comprising a sequence of video samples, the sequence of video samples comprising a finite quantity of samples;
    generating a decode timeline identifying a decode order associated with the sequence of video samples and a display timeline identifying a display order associated with the sequence of the video samples;
    determining that a decode end time of a last video sample in the decode timeline is earlier than a display end time of a last video sample in the display timeline; and
    in response to said determining, extending a decode duration associated with the last video sample in the decode timeline, such that the decode end time of the video sample that is last in the decode timeline and has the extended decode duration equals the display end time of the last video sample in the display timeline.

13. The method of claim 12, further comprising:
    appending another video clip to the edited video clip, where a first video sample of the other video clip is a reference video sample, the other video clip being appended such that a decode start time associated with the first video sample of the other video clip immediately succeeds the decode end time of the last video sample in the decode timeline of the edited video clip.

14. A system comprising processor electronics configured to:
- edit a video clip comprising a sequence of video samples, the sequence of video samples comprising a finite quantity of samples;
- generate a decode timeline identifying a decode order associated with the sequence of video samples and a display timeline identifying a display order associated with the sequence of video samples, such that a decode start time of a first sample in the generated decode timeline is equal to a display start time of a first sample in the generated display timeline;
- determine, for each one of the sequence of video samples, a magnitude of a time period between a display start time and a decode end time associated with the one of the sequence of video samples;
- obtain a time offset as a largest time period magnitude from among the determined time period magnitudes;
- offset the generated decode timeline from the generated display timeline such that the decode start time of the first sample in the offset decode timeline precedes the display start time of the first sample in the generated display timeline by the obtained time offset; and
- play the edited video clip in accordance with the offset decode timeline and the generated display timeline.

15. The system of claim 14, wherein the decode order identified in the decode first timeline differs from the display order identified in the display timeline.

16. The system of claim 14, wherein a decode duration is associated with one or more samples included in the sequence of video samples.

17. The system of claim 16, wherein a decode duration associated with a first sample included in the sequence of video samples differs from a decode duration associated with a second sample included in the sequence of video samples.

18. The system of claim 14, wherein a display offset is associated with one or more samples included in the sequence of video samples.

19. The system of claim 14, wherein a first sample included in the sequence of video samples is associated with a first format and a second sample included in the sequence of video samples is associated with a second format.

20. The system of claim 14, wherein a first sample included in the sequence of video samples is associated with a first frame rate and a second sample included in the sequence of video samples is associated with a second frame rate.

21. The system of claim 14, wherein the processor electronics are further configured to:
- reedit the video clip having the offset decode timeline and the generated display timeline, such that the reedited video clip comprises another sequence of video samples;
- generate another decode timeline identifying another decode order associated with the other sequence of video samples and another display timeline identifying another display order associated with the other sequence of video samples; and
- offset the other generated decode timeline from the other generated display timeline, at least in part by
  - obtain a revised offset between the other generated decode timeline and the other generated display timeline, and
  - offset the other generated decode timeline from the other generated display timeline based on the revised offset.

22. The system of claim 14, further comprising a common data store to store the sequence of video samples.

23. The system of claim 14, wherein the processor electronics are further configured to:
- determine a display duration associated with a video sample included in the sequence of video samples based on a display time corresponding to an immediately succeeding video sample in the display order.

24. The system of claim 14, wherein one or more video samples included in the sequence of video samples of the edited video clip are associated with a first video clip and one or more other samples included in the sequence of video samples are associated with a second video clip.

25. A system comprising:
- processor electronics configured to
  - edit a video clip comprising a sequence of video samples, the sequence of video samples comprising a finite quantity of samples,
  - generate a decode timeline identifying a decode order associated with the sequence of video samples and a display timeline identifying a display order associated with the sequence of the video samples,
  - determine that a decode end time of a last video sample in the decode timeline is earlier than a display end time of a last video sample in the display timeline, and
  - in response to the determination, extend a decode duration associated with the last video sample in the decode timeline, such that the display end time of the last video sample in the display timeline equals the decode end time of the video sample that is last in the decode timeline and has the extended decode duration.

26. The system of claim 25, wherein the processor electronics are further configured to append another video clip to the edited video clip, where a first video sample of the other video clip is a reference video sample, the other video clip being appended such that a decode start time associated with the first video sample of the other video clip immediately succeeds the decode end time of the last video sample in the decode timeline of the edited video clip.

* * * * *